US011875793B2

(12) United States Patent
Yuan et al.

(10) Patent No.: US 11,875,793 B2
(45) Date of Patent: Jan. 16, 2024

(54) COGNITIVE NATURAL LANGUAGE PROCESSING SOFTWARE FRAMEWORK OPTIMIZATION

(71) Applicant: INTERNATIONAL BUSINESS MACHINES CORPORATION, Armonk, NY (US)

(72) Inventors: Zhong Fang Yuan, Xian (CN); Tong Liu, Xian (CN); De Shuo Kong, Beijing (CN); Yao Chen, Beijing (CN); Hai Bo Zou, Beijing (CN); Sarbajit K. Rakshit, Kolkata (IN); Zheng Jie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 17/446,993

(22) Filed: Sep. 7, 2021

(65) Prior Publication Data
US 2023/0072003 A1 Mar. 9, 2023

(51) Int. Cl.
*G10L 15/22* (2006.01)
*G06F 16/28* (2019.01)
(Continued)

(52) U.S. Cl.
CPC .......... *G10L 15/22* (2013.01); *G06F 16/2456* (2019.01); *G06F 16/284* (2019.01); *G10L 15/18* (2013.01)

(58) Field of Classification Search
CPC ............... G06F 16/2456; G06F 16/285; G06F 16/90332; G06F 16/3329; G10L 15/00;
(Continued)

(56) References Cited

U.S. PATENT DOCUMENTS 9,996,532 B2 6/2018 Sarikaya
10,573,312 B1 * 2/2020 Thomson ................ G10L 15/22
(Continued)

FOREIGN PATENT DOCUMENTS

CN 111581958 A 8/2020
CN 112100349 A 12/2020

OTHER PUBLICATIONS

Cao, Zack et al.; Transforming Early Childhood Learning with AI Enabled Robots; IEEE AI+ Intelligent Adaptive ducation Summit; 2019; 3 pages.
(Continued)

*Primary Examiner* — Mark Villena
(74) *Attorney, Agent, or Firm* — Schmeiser, Olsen & Watts, LLP; Edward Wixted

(57) ABSTRACT

A system, method, and computer program product for implementing cognitive natural language processing software framework optimization is provided. The method includes receiving instructions associated with an audible user input of a user. An AI input intention of the user is determined and key information is extracted from the audible user input. The key information is inputted into a generated database table and additional key information is retrieved from a dialog table. A supplementary database table comprising the additional key information is generated and the key information is spliced with the additional key information. A resulting spliced data structure is merged into a final database table and natural language is converted into a request code structure within an SQL structure and an interactive AI interface presenting results of the converting is generated. Operational functionality of an AI device is enabled for audibly presenting results of the conversion.

20 Claims, 14 Drawing Sheets

(51) Int. Cl.
*G06F 16/2455* (2019.01)
*G10L 15/18* (2013.01)

(58) Field of Classification Search
CPC ... G10L 15/22; G10L 2015/223; G10L 15/26; G10L 15/18
See application file for complete search history.

(56) References Cited

U.S. PATENT DOCUMENTS

| | | | |
|---|---|---|---|
| 2014/0365880 A1* | 12/2014 | Bellegarda | G06F 16/90324 715/261 |
| 2016/0171050 A1* | 6/2016 | Das | G06F 16/90332 707/718 |
| 2019/0222540 A1* | 7/2019 | Relangi | H04M 3/42042 |
| 2019/0347298 A1* | 11/2019 | Kumar | G10L 15/26 |
| 2020/0175987 A1* | 6/2020 | Thomson | G10L 15/26 |
| 2020/0177527 A1 | 6/2020 | Liu | |
| 2020/0380964 A1 | 12/2020 | Kang | |
| 2020/0387550 A1* | 12/2020 | Cappetta | H04L 51/02 |
| 2021/0034625 A1* | 2/2021 | Shah | G06F 16/9024 |
| 2021/0306287 A1* | 9/2021 | Sundaravadivel | H04L 51/02 |
| 2021/0390096 A1* | 12/2021 | Rahmfeld | G10L 15/08 |
| 2022/0035596 A1* | 2/2022 | Hu | G06F 16/3329 |
| 2022/0067037 A1* | 3/2022 | Ranganathan | G10L 15/22 |
| 2022/0270600 A1* | 8/2022 | Aggarwal | G06Q 30/0633 |

OTHER PUBLICATIONS

Habib, Javeria et al.; IAI MovieBot: A Conversational Movie Recommender System; In the Proceedings of the 29th ACM International Conference on Information and Knowledge Management; Oct. 29-23, 2020 virtual Event; arXiv:2009.03668v1; Sep. 8, 2020; 4 pages.

Mell, Peter et al.; "The NIST Definition of Cloud Computing;" National Institute of Standards and Technology; Special Publication 800-145; Sep. 2011; 7 pages.

Shi, Hongjie; A Sequence-to-sequence Approach for Numerical Slot-filling Dialog Systems, Proceedings of the 21st Annual Meeting of the Special Interest Group on Discourse and Dialogue; Jul. 2020; 6 pages.

\* cited by examiner

COGNITIVE NATURAL LANGUAGE PROCESSING SOFTWARE FRAMEWORK OPTIMIZATION

BACKGROUND

The present invention relates generally to a method for optimizing a cognitive natural language processing software framework and in particular to a method and associated system for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device.

SUMMARY

A first aspect of the invention provides an artificial intelligence (AI) server comprising a processor coupled to a computer-readable memory unit, the memory unit comprising instructions that when executed by the processor implements a cognitive natural language processing software framework optimization method comprising: receiving, by the processor from a user, instructions associated with an audible user input of the user; determining, by the processor executing intention recognition code with respect to the instructions and the audible user input, an AI input intention of the user; extracting, by the processor in response to results of the determining, key information from the audible user input; automatically generating, by the processor, a database table with respect to an information slot associated with a conversion process; inputting, by the processor, said key information into the database table; retrieving, by the processor, additional key information from a historical dialog table; generating, by the processor, a supplementary database table comprising the additional key information; splicing, by the processor, the key information with the additional key information resulting in the generation of a spliced data structure comprising the key information and the additional key information; merging, by the processor executing JOIN operation code, the spliced data structure into a final database table via execution of multi-modal semantic matching code with respect to natural language processing; converting, by the processor, natural language and associated digital code of the final database table into a request code structure within an SQL structure for generating final candidate set boundaries and logical constraints using with respect to execution of NL2SQL code; enabling, by the processor, an interactive AI interface presenting a modified portion of the key information and the additional key information with respect to results of the converting; and enabling, by the processor via the interactive AI interface, operational functionality of an AI device audibly presenting results of the converting.

A second aspect of the invention provides a cognitive natural language processing software framework optimization method comprising: receiving, by a processor of an artificial intelligence (AI) server from a user, instructions associated with an audible user input of the user; determining, by the processor executing intention recognition code with respect to the instructions and the audible user input, an AI input intention of the user; extracting, by the processor in response to results of the determining, key information from the audible user input; automatically generating, by the processor, a database table with respect to an information slot associated with a conversion process; inputting, by the processor, said key information into the database table; retrieving, by the processor, additional key information from a historical dialog table; generating, by the processor, a supplementary database table comprising the additional key information; splicing, by the processor, the key information with the additional key information resulting in the generation of a spliced data structure comprising the key information and the additional key information; merging, by the processor executing JOIN operation code, the spliced data structure into a final database table via execution of multi-modal semantic matching code with respect to natural language processing; converting, by the processor, natural language and associated digital code of the final database table into a request code structure within an SQL structure for generating final candidate set boundaries and logical constraints using with respect to execution of NL2SQL code; enabling, by the processor, an interactive AI interface presenting a modified portion of the key information and the additional key information with respect to results of the converting; and enabling, by the processor via the interactive AI interface, operational functionality of an AI device audibly presenting results of the converting.

A third aspect of the invention provides a computer program product, comprising a computer readable hardware storage device storing a computer readable program code, the computer readable program code comprising an algorithm that when executed by a processor of an AI server implements a cognitive natural language processing software framework optimization method, the method comprising: monitoring, by the processor, executing an opensource monitor component, operational performance of a software model; receiving, by a processor of an artificial intelligence (AI) server from a user, instructions associated with an audible user input of the user; determining, by the processor executing intention recognition code with respect to the instructions and the audible user input, an AI input intention of the user; extracting, by the processor in response to results of the determining, key information from the audible user input; automatically generating, by the processor, a database table with respect to an information slot associated with a conversion process; inputting, by the processor, said key information into the database table; retrieving, by the processor, additional key information from a historical dialog table; generating, by the processor, a supplementary database table comprising the additional key information; splicing, by the processor, the key information with the additional key information resulting in the generation of a spliced data structure comprising the key information and the additional key information; merging, by the processor executing JOIN operation code, the spliced data structure into a final database table via execution of multi-modal semantic matching code with respect to natural language processing; converting, by the processor, natural language and associated digital code of the final database table into a request code structure within an SQL structure for generating final candidate set boundaries and logical constraints using with respect to execution of NL2SQL code; enabling, by the processor, an interactive AI interface presenting a modified portion of the key information and the additional key information with respect to results of the converting; and enabling, by the processor via the interactive AI interface, operational functionality of an AI device audibly presenting results of the converting.

The present invention advantageously provides a simple method and associated system capable of optimizing a cognitive natural language processing software framework.

DETAILED DESCRIPTION

Figure 1:
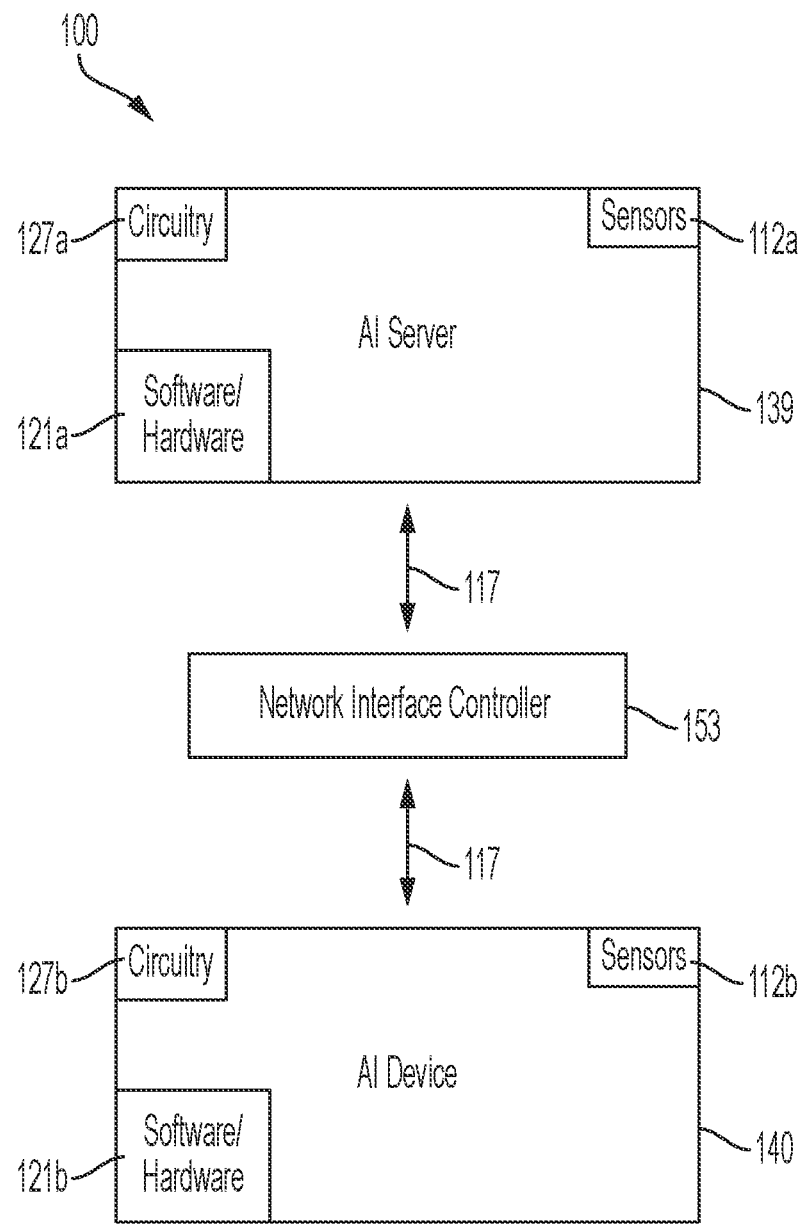
FIG. 1 illustrates a system for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device, in accordance with embodiments of the present invention.

FIG. 1 illustrates a system 100 for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device, in accordance with embodiments of the present invention. Typical processes for implementing multi-round dialog tasks associated with slot filling comprise a template for each differing scenario. The execution of a dialog task is not triggered until information within a template has been collected. However, the following issues exist in a current multi-round dialogue framework represented such that a dialogue is typically divided into multiple contexts (e.g., each context corresponds to a scene). Therefore, cross-context information may not be exchanged (i.e., valid information in a previous round cannot be supplemented by information in a next round). Likewise, a predefined template may not be processed if additional slot information is entered by a user. Additionally, a current processing method is often strongly associated with intention recognition corpus or reformulate rules may be required for adjustment thereby removing a common processing method. Therefore, system 100 enables a process for converting a one-dimensional semi-structured data structure from a sentence-slot to a two-dimensional structured data structure comprising an entity-table thereby enabling a process for combining operations in relational databases with natural language processing algorithms. Likewise, system 100 enable natural language processing technology for converting all key information in dialogue into a two-dimensional data table format.

System 100 is configured to update deep learning models based on executing semi-federated training code by uploading new features for selecting federate processes and validating a re-trained model. Likewise, system 100 is configured to enable multi-model semantic matching in natural language processing. Multiple key values requiring matching may be processed into a vector form via execution of deep learning multi-modal semantics for matching by semantic similarity. If a similarity attribute (determined during a matching process) exceeds a specified threshold, the multiple key values may be connected. System 100 executed NL2SQL (i.e., a conversation user interface) code (after retrieving a final candidate information set) for converting natural language users into a request body within an SQL structure for determining final candidate set boundaries and logical constraints with respect to a "besides" logical condition a "less than" logical condition, or a "greater than" logical condition.

System 100 is further configured to optimize a one-dimensional (1D) semi-structured data structure of a multi-round dialogue framework by converting the 1D semi-structured data structure to a two-dimensional (2D) structured data structure from an entity table to join logical operations within a relational database associated natural language processing code execution. The aforementioned optimization process includes:

1. Modifying a 1D semi-structured data structure of a template and splicing information (from a different context or multiple rounds of templates) together.
2. Associating the spliced information associated with different context using a JOIN operation (of a relational database) via execution of multi-modal semantic matching within natural language processing.
3. Converting a user's natural language into a request body within an SQL structure for determining final candidate set boundaries and logical constraints using a NL2SQL process after retrieving a final candidate information set to process similar logical conditions.

System 100 of FIG. 1 includes an artificial intelligence (AI) server 139, an AI device 140, and network interface controller 153 interconnected through a network 7. AI server 139 comprises sensors 112a, circuitry 127a, and software/hardware 121a. AI device 139 comprises sensors 112b, circuitry 127b, and software/hardware 121b. AI server 139 and AI device 140 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, AI server 139 and AI device 140 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6 The specialized discrete non-generic analog, digital, and logic-based circuitry (e.g., sensors 112a and 112b, circuitry/logic 127a and 127b, software/hardware 121a and 121b, etc.) may include proprietary specially designed components (e.g., a specialized integrated circuit, such as for example an Application Specific Integrated Circuit (ASIC) designed for only implementing an automated process for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device. Sensors 112a and 112b may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a process for implementing multi-round dialogue technology (i.e., a process in which human entities and AI programs activate more than three rounds of dialogue in which the human entities issue instructions to an associated AI program and the AI program obtains instructions for execution). A current multi-round dialogue method relies on a process for filling slots (i.e., information gaps to be filled). Differing tasks comprise necessary information slots that require extracting information from a dialogue and after all information to be extracted has been obtained, the AI will execute tasks assigned by human entities. For example (with respect to a task for booking air tickets) an AI system is enabled to extract three slots of information: departure time, departure location, and arrival location and a dialogue between human entities and an AI programs is as follows:

A human entity states: "please help me book a flight from New York to Los Angeles" and in response processing logic of an AI program is executed as follows:

The AI program extracts the three slots of information (departure time, departure location, and arrival location) from the aforementioned human entity command and verifies two slots of information (i.e., departure location is New York and (arrival location is Los Angeles) but is unable to verify departure time information. Therefore, AI system must request this information from the human entity as follows:

AI system request: May I ask what time do you leave?

Human entity response: Tomorrow morning at 9 o'clock.

In response, the AI system processes as follows: get [departure time is tomorrow morning 9 o'clock], all information is collected, and the AI system initiates a ticket booking task program and returns information associated with a successful ticket booking process with the following response: AI: Okay, I've booked you a EuroAir ticket from New York to Los Angeles at 9 o'clock tomorrow morning. The aforementioned example comprises an entire process associated with multiple rounds of dialogue and is associated with three issues as follows:

1. Information with respect to different topics within multiple rounds of dialogue may be shared.
2. If the limited information presented by human entities exceeds the number of slots limited by task, extra information is automatically ignored by the AI system.
3. If negative information (e.g., not) is received from the human entity, the negative information may not by captured due to limitations of current natural language processing technology.

Therefore, system 100 enables a process for optimizing a data structure of a multi-round dialog by converting a 1D semi-structured data structures from a sentence-slot to 2D structured data structures from an entity table by combining operations in a relational database via execution of natural language processing code.

Figure 2:
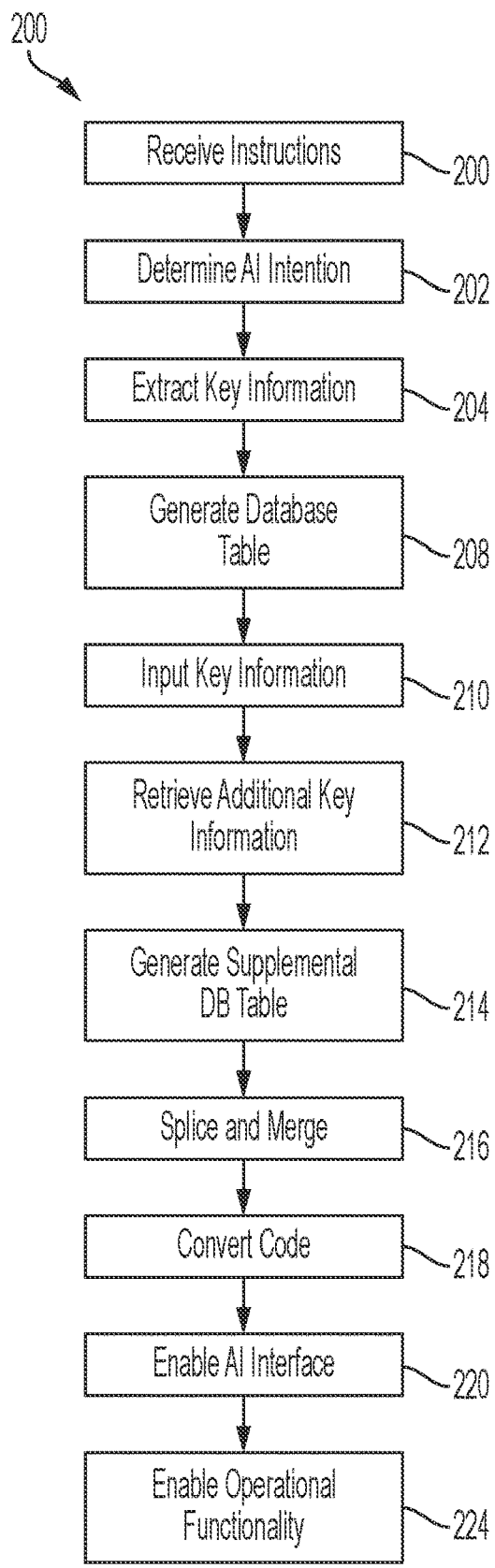
FIG. 2 illustrates an algorithm detailing a process flow enabled by the system of FIG. 1 for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device, in accordance with embodiments of the present invention.

FIG. 2 illustrates an algorithm detailing a process flow enabled by system 100 of FIG. 1 for improving software technology associated with executing an edge device based deep learning software model modification process, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by AI server 139 and AI device 140. In step 200, instructions associated with an audible user input of a user are received by an artificial intelligence (AI) server. In step 202, an AI input intention of the user is determined via execution of intention recognition code with respect to the instructions and the audible user input. In step 204, key information is extracted from the audible user input. Extracting the key information may include executing bidirectional encoder representations from transformers (BERT) and conditional random field (CRF) code for enabling the extraction.

In step 208, a database table is generated with respect to an information slot associated with a conversion process. In step 210, key information is inputted into the database table. In step 212, additional key information is retrieved from a historical dialog table. The key information may be associated with a differing context than the additional key information.

In step 214, a supplementary database table comprising the additional key information is generated. The database table and the supplemental database table each may include an unstructured one dimensional sentence-slot structure and the final database table may include a structured two dimensional database table.

In step 216, the key information is spliced with the additional key information resulting in the generation of a spliced data structure comprising the key information and the additional key information. Likewise, the spliced data structure is merged (via execution of JOIN operation code) said into a final database table via execution of multi-modal semantic matching code with respect to natural language processing. The merging process may be executed within a relational database.

In step 218, natural language and associated digital code of the final database table is converted into a request code structure within an SQL structure for generating final candidate set boundaries and logical constraints using with respect to execution of NL2SQL code. The SQL structure may be configured to modify the final database table.

In step 220, an interactive AI interface presenting a modified portion of the key information and additional key information is enabled with respect to results of step 218. In step 224, operational functionality of an AI device audibly presenting results of step 218 is enabled via the interactive AI interface. The AI device may include a hardware device comprising a chatbot.

Figure 3:
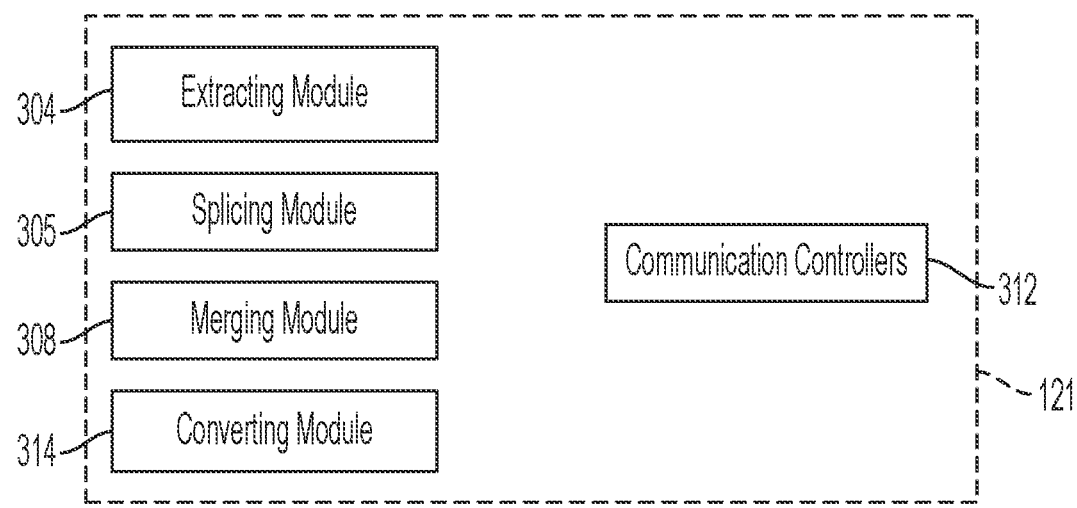
FIG. 3 illustrates an internal structural view of the software/hardware of FIG. 1, in accordance with embodiments of the present invention.

FIG. 3 illustrates an internal structural view of software/hardware 121 (i.e., 121a and/or 121b) of FIG. 1, in accordance with embodiments of the present invention. Software/hardware 121 includes an extracting module 304, a splicing module 305, a merging module 308, a converting module 314, and communication controllers 312. Extracting module 304 comprises specialized hardware and software for controlling all functions related to the extracting steps of FIG. 2. Splicing module 305 comprises specialized hardware and software for controlling all functionality related to the splicing steps described with respect to the algorithm of FIG. 2. Merging module 308 comprises specialized hardware and software for controlling all functions related to the merging steps of FIG. 2. Converting module 314 comprises specialized hardware and software for controlling all functions related to the conversion steps of the algorithm of FIG. 2. Communication controllers 412 are enabled for controlling all communications between extracting module 304, splicing module 305, merging module 308, and converting module 314.

FIGS. 4A-4E, in combination, illustrate an implementation example enabled by system 100 of FIG. 1 for converting a one-dimensional semi-structured data structure from a sentence-slot structure to a two-dimensional structured data structure entity-table, in accordance with embodiments of the present invention. The process described in the implementation example enables system 100 to combine operations within relational databases via execution of natural language processing algorithms thereby using natural language processing technology to convert all key information of a dialogue into a two-dimensional data table format.

Figure 4A:
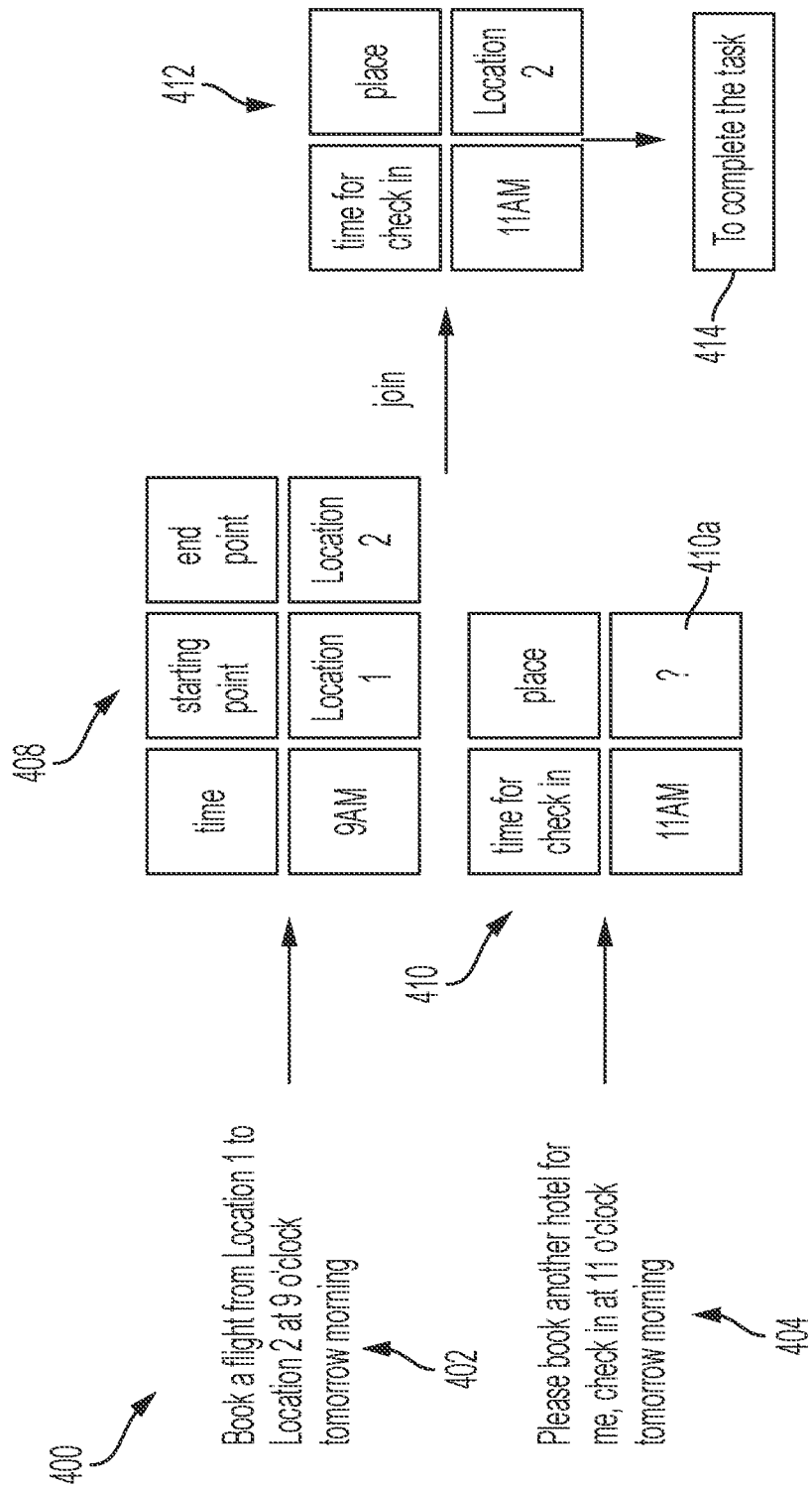
FIGS. 4A-4E, in combination, illustrate an implementation example enabled by the system of FIG. 1 for converting a one-dimensional semi-structured data structure from a sentence-slot structure to a two-dimensional structured data structure entity-table, in accordance with embodiments of the present invention.

FIG. 4A initiates a step 400 for analyzing different topics occurring within multiple rounds of dialogue that may not be shared. For example, the process is performed with respect to booking airline tickets hotels. The process is initiated when a human entity instructs an AI component to book a flight from New York to Los Angeles at 9 am the following morning as illustrated in step 402. In response, all necessary information is filled in a form and placed into a database table 408. When the human entity instructs the AI component to book hotel, all necessary information is additionally filled in the form placed into database table 410 as illustrated in step 404. In response, system 100 determines that information is missing in portion 410a of database table 410 and system 100 is configured to automatically retrieve the relevant information from a previous chat process to execute a join operation to retrieve the relevant information. In response, database table 412 is generated.

Figure 4B:
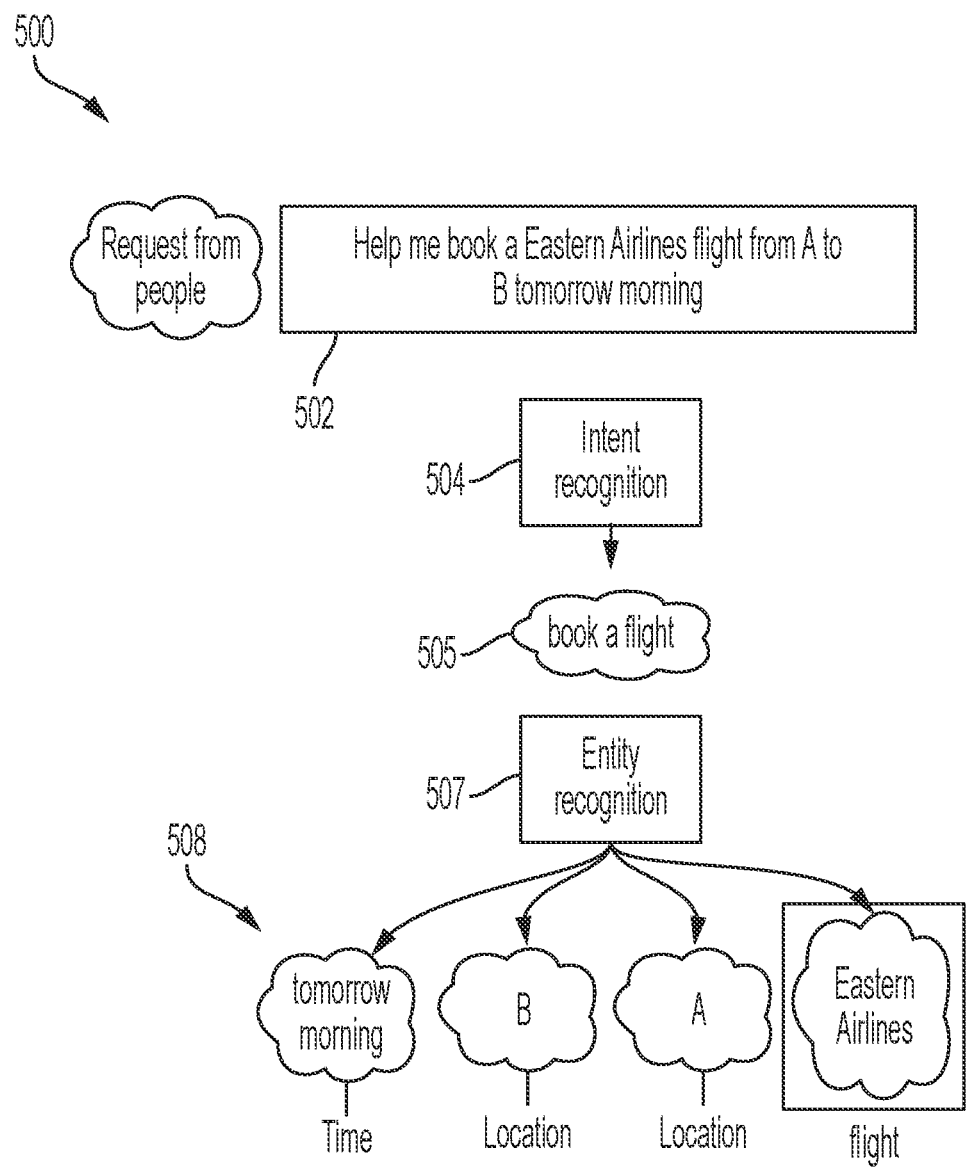

FIG. 4B initiates a step 500 for detecting if limited information entered via the human entity exceeds a number of slots limited by the task itself. Results of the detection may be configured to command the AI to automatically ignore all extra information. For example, the following steps may be executed:

In step 502, human entity instructions are retrieved. In step 504, an intention recognition process is executed (via execution of specialized code) to determine that the human entity intention is to book a flight 505. In step 507, entity recognition technology (e.g., an algorithm such as usually BERT+CRF) is enabled for extracting key (digital) information 508.

Figure 4C:
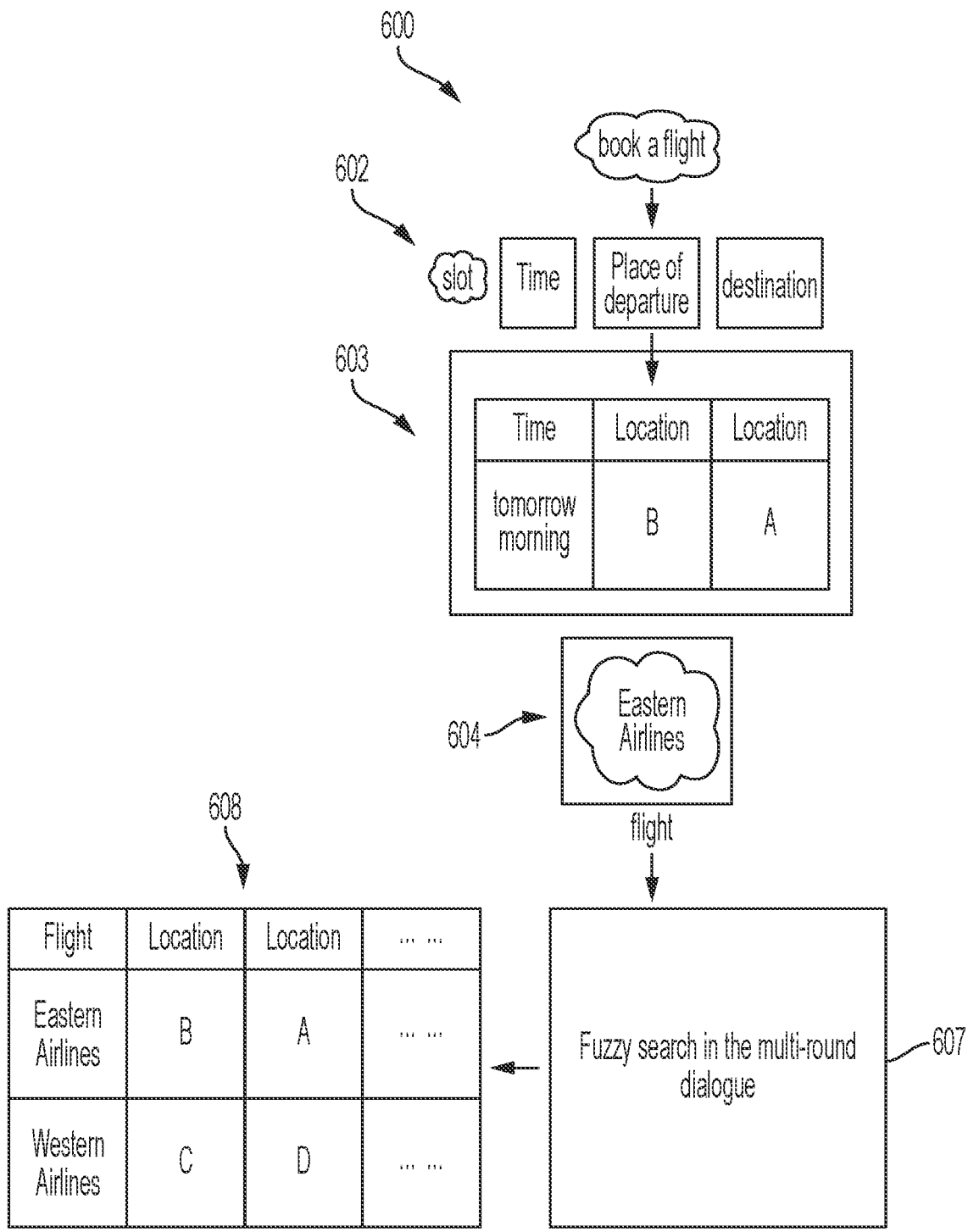

FIG. 4C initiates an additional step 600 for detecting if limited information entered via the human entity exceeds a number of slots limited by the task itself. Results of the detection may be configured to command the AI to automatically ignore all extra information. For example, the following steps may be executed with respect to a scenario where an airplane ticket was booked but additional flight information is requested:

In step 602, extracted information is placed into the data table 603. In step 604, a search 607 is executed with respect to an additional information type (e.g., flight information) within the historical dialogue table to obtain a supplementary information table 608.

Figure 4D:
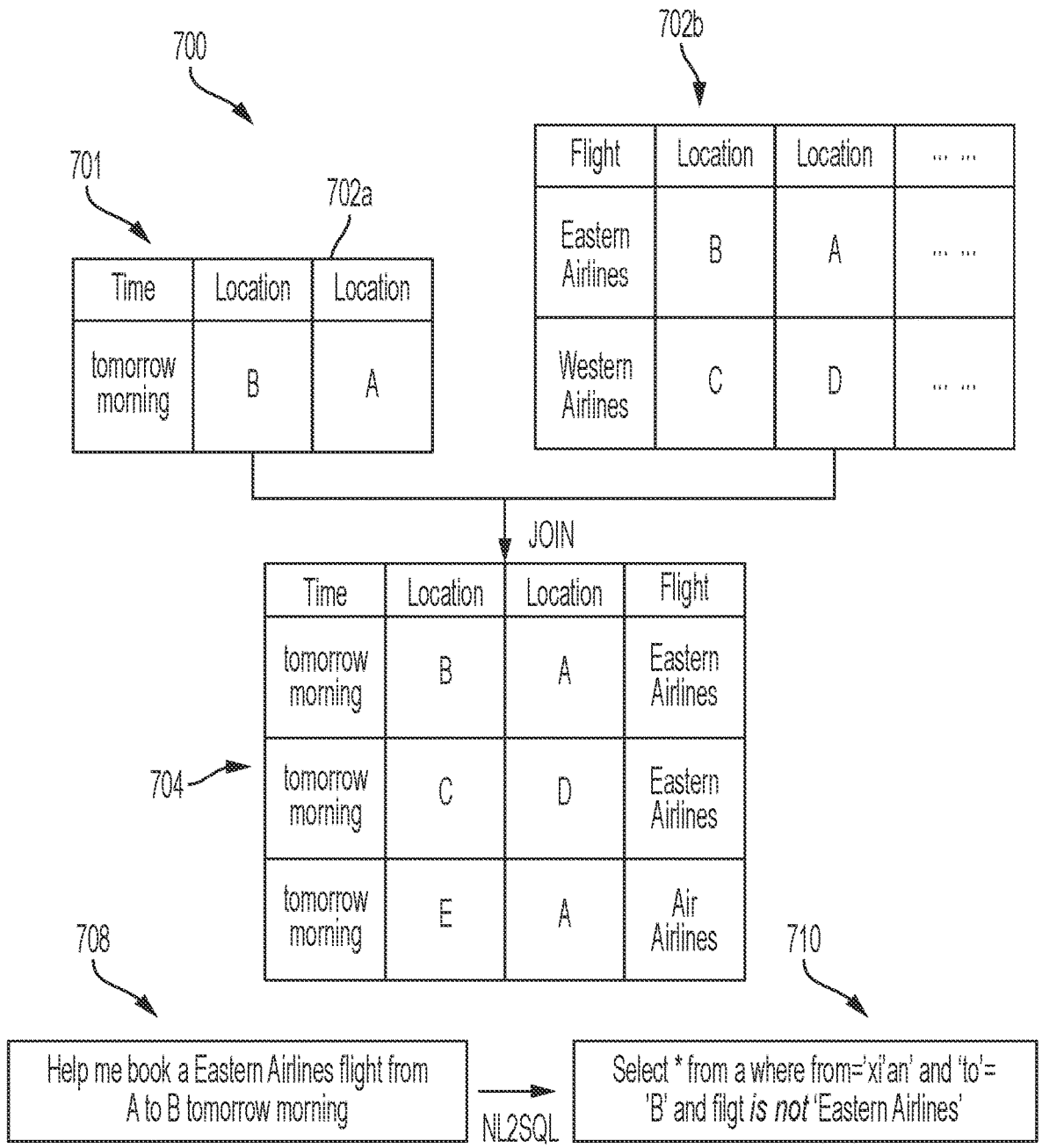

FIG. 4D initiates an additional step 700 for detecting if limited information entered via the human entity exceeds a number of slots limited by the task itself. Results of the detection may be configured to command the AI to automatically ignore all extra information. For example, the following steps may be executed:

In step 701, a join operation is executed to merge tables 701a and 701b (as generated in FIG. 4C) into a table 704 comprising a complete set on information. In steps 708 and 710, NL2SQL technology based code is executed to convert human natural language commands into SQL statements that may be executed with respect to database tables.

Figure 4E:
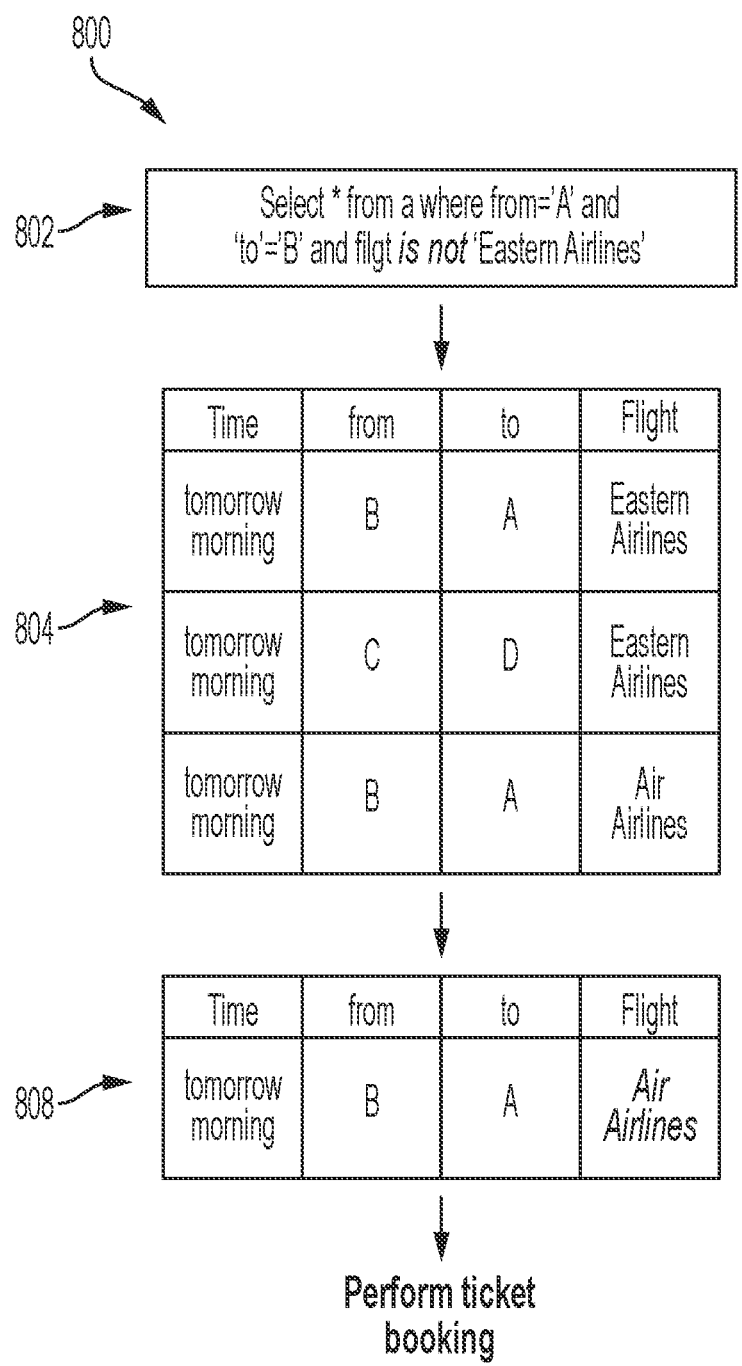

FIG. 4E initiates an additional step 700 for detecting if limited information entered via the human entity exceeds a number of slots limited by the task itself. Results of the detection may be configured to command the AI to automatically ignore all extra information. For example, the following step may be executed:

In step 802, generated SQL is executed to act on tables 804 and 808 comprising all information to generate a final result.

Figure 5:
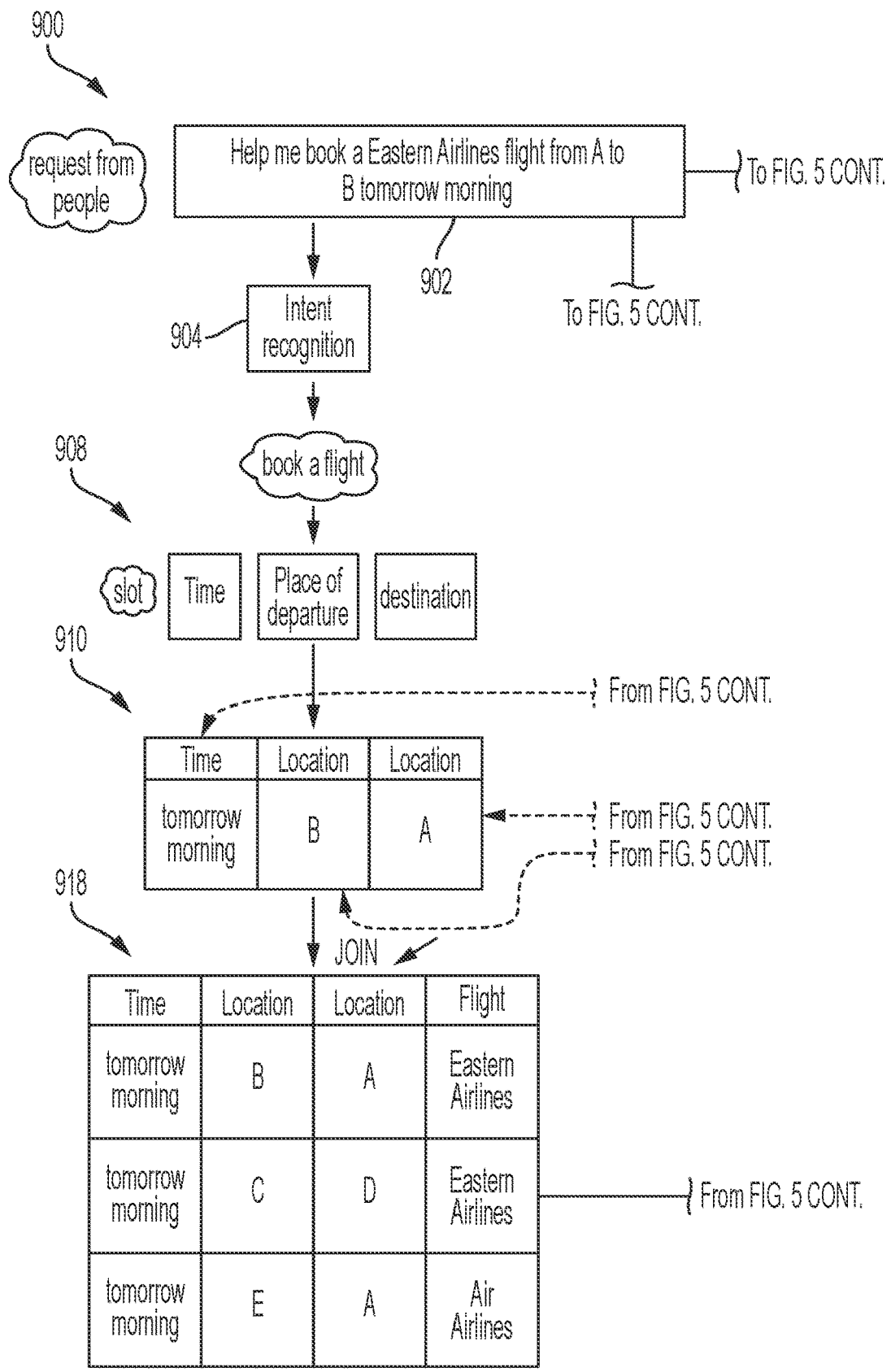
FIG. 5 illustrates an overall view of the implementation example described with respect to FIGS. 4A-4E for converting a one-dimensional semi-structured data structure from a sentence-slot structure to a two-dimensional structured data structure entity-table, in accordance with embodiments of the present invention.
Figure 5:
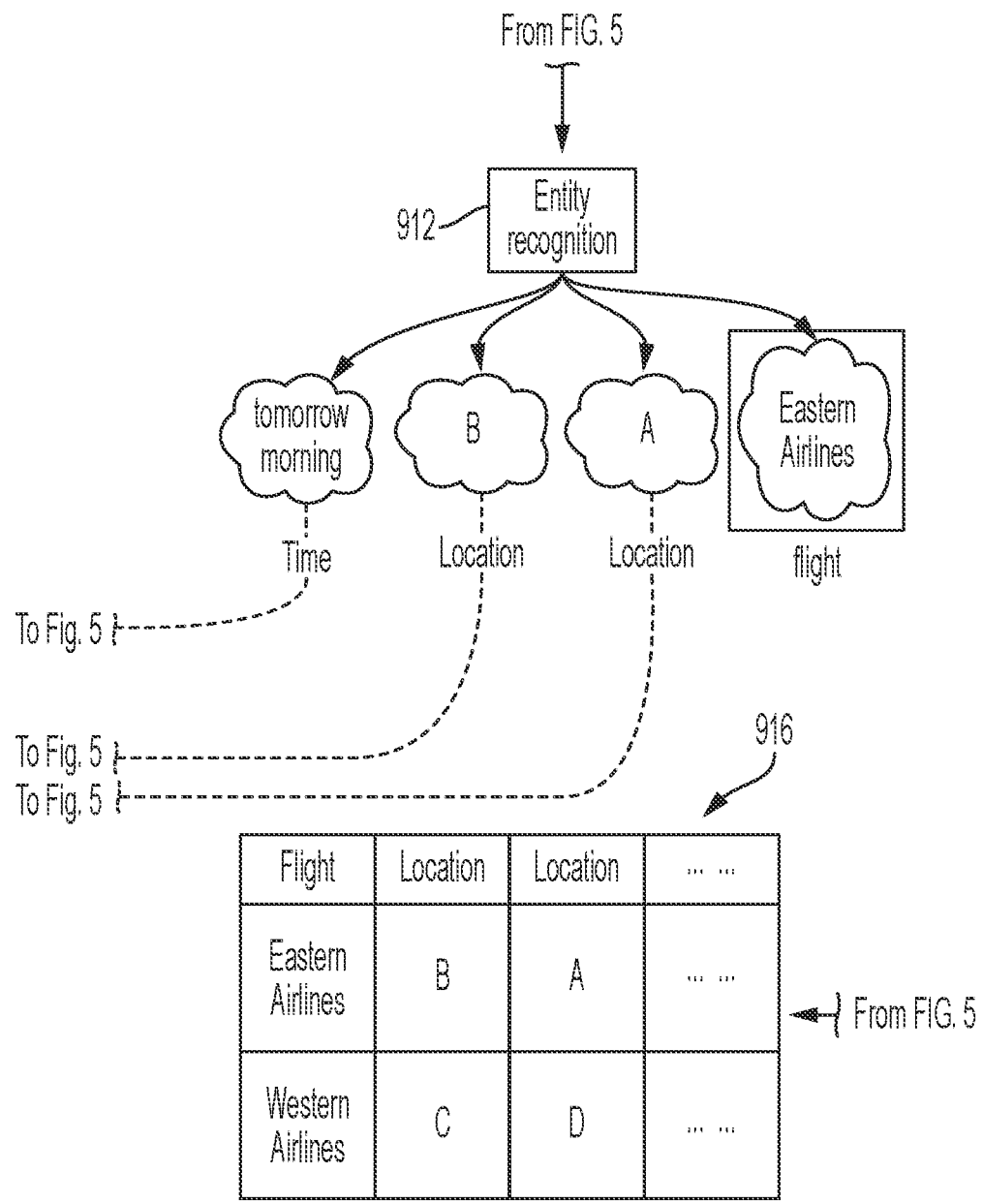
Figure 5:
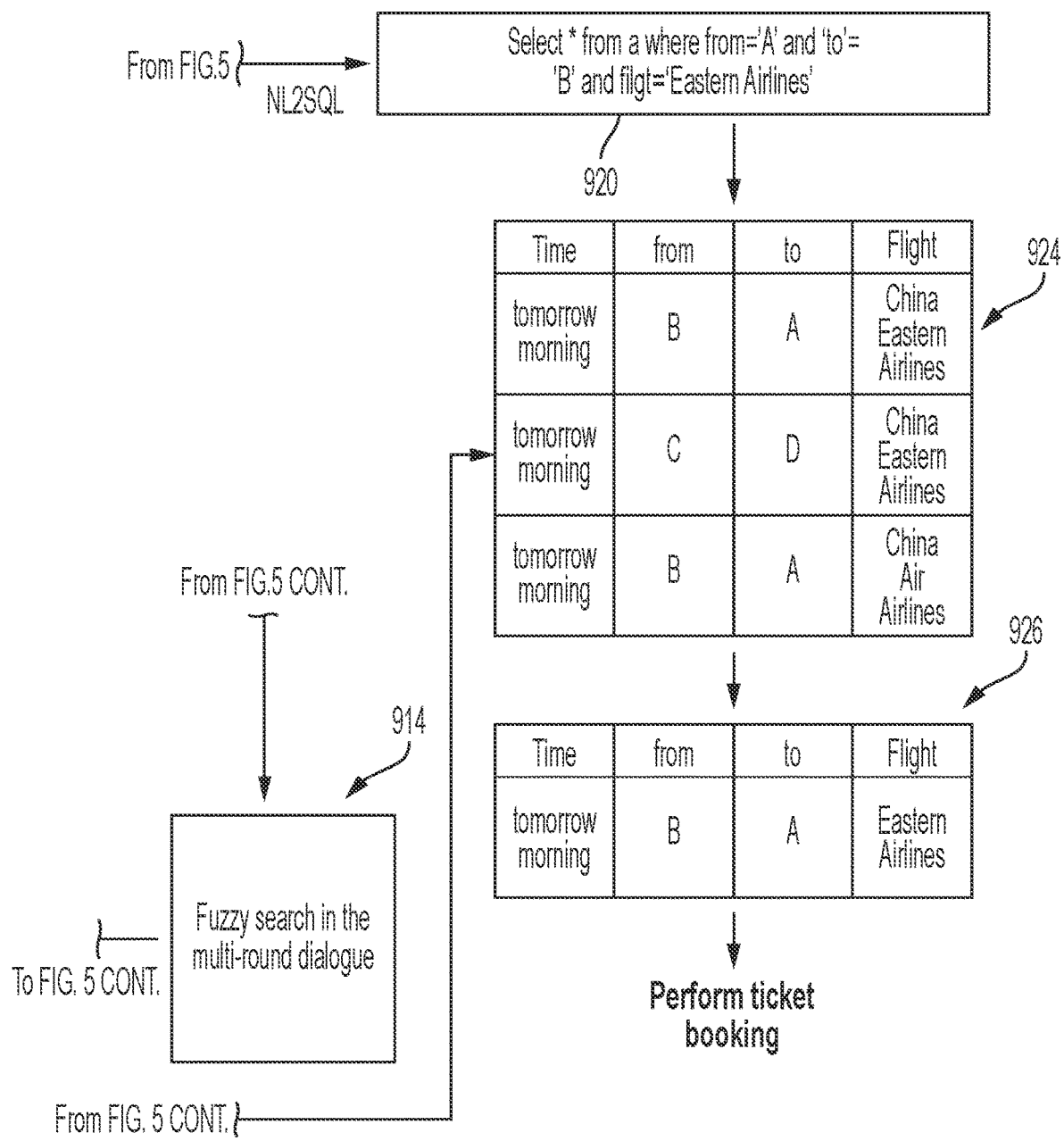

FIG. 5 illustrates an overall view of the implementation example described with respect to FIGS. 4A-4E for converting a one-dimensional semi-structured data structure from a sentence-slot structure to a two-dimensional structured data structure entity-table, in accordance with embodiments of the present invention. The process illustrated in FIG. 5 is configured to modify an underlying data structure of a template can be changed. Likewise, process illustrated in FIG. 5 is configured to retrieve information from differing context or multiple rounds of templates splicing together with respect to joining within a relational database. The aforementioned is configured to improve an association process executed within relational database via execution of semantic matching code. Subsequently, NL2SQL is executed to parse user's natural language questions to solve operational issues.

Figure 6:
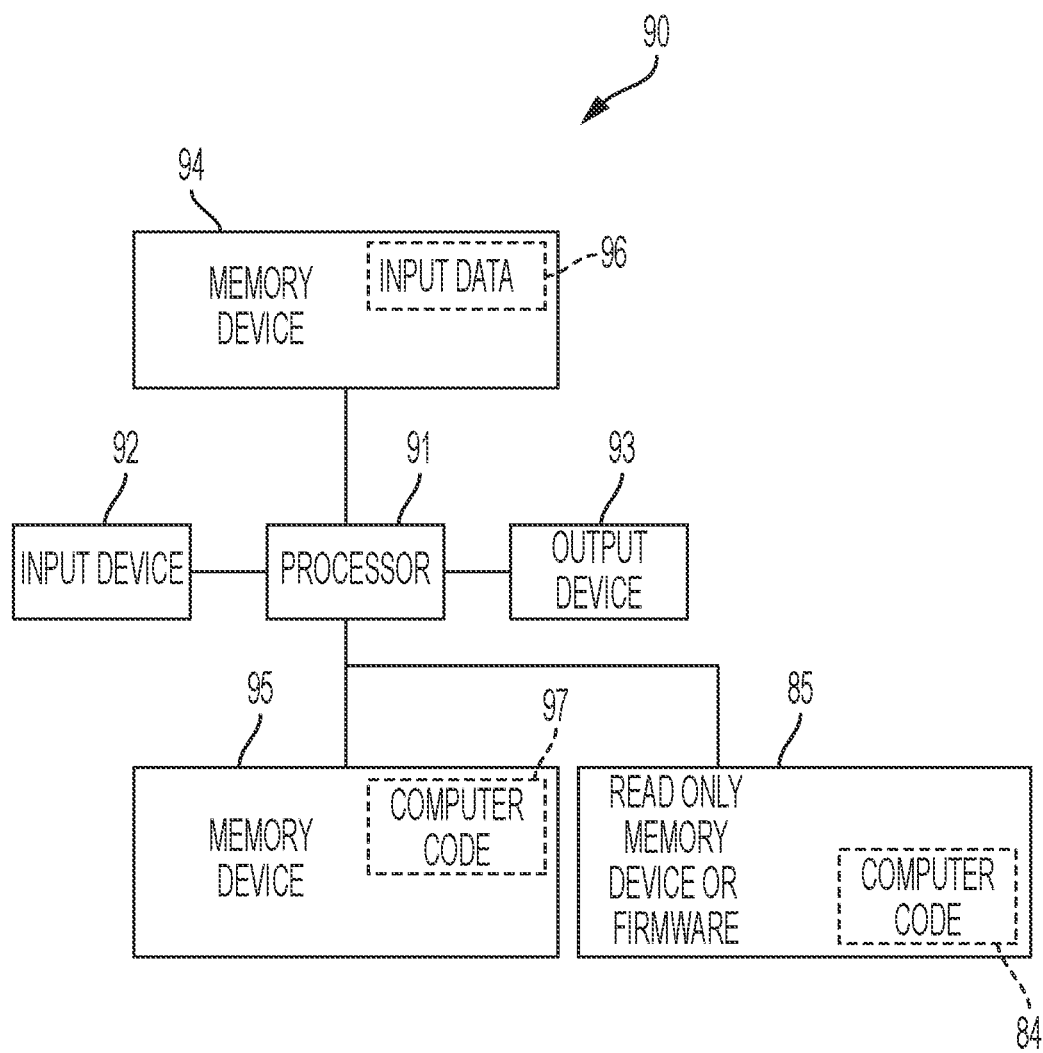
FIG. 6 illustrates a computer system used by the system of FIG. 1 for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device, in accordance with embodiments of the present invention.

FIG. 6 illustrates a computer system 90 (e.g., AI server 139 and AI device 140 of FIG. 1) used by or comprised by the system 100 of FIG. 1 for improving software technology associated with determining an AI input intention of a user;

extracting key information from the audible user input and inputting the key information into a database table; splicing the key information with additional key information resulting in the generation of a spliced data structure for merging into a final database table being converted for enabling an interactive AI interface for enabling operational functionality of an AI device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device. In another embodiment, the invention provides a business method that performs the process steps of the invention on a subscription, advertising, and/or fee basis. That is, a service supplier, such as a Solution Integrator, could offer to enable a process for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
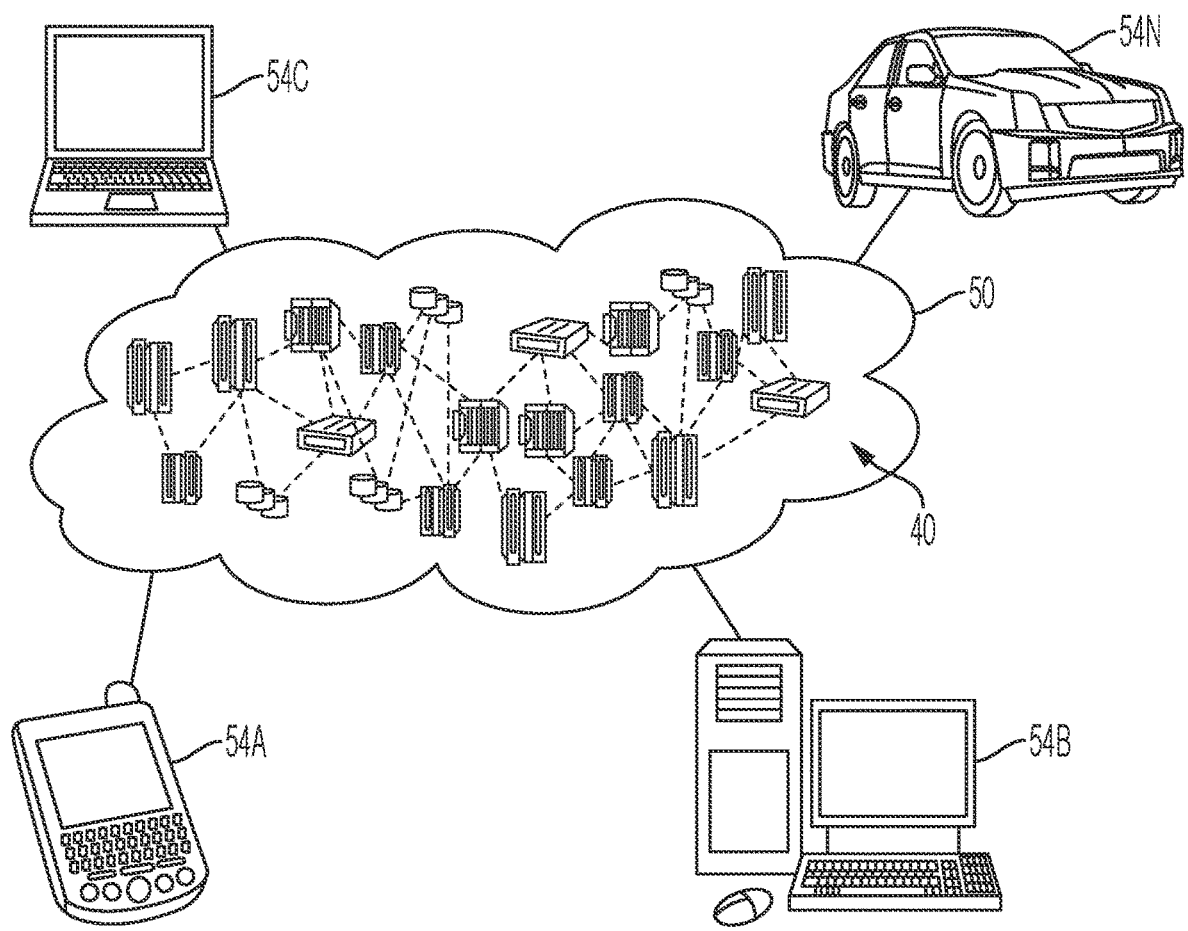
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 8:
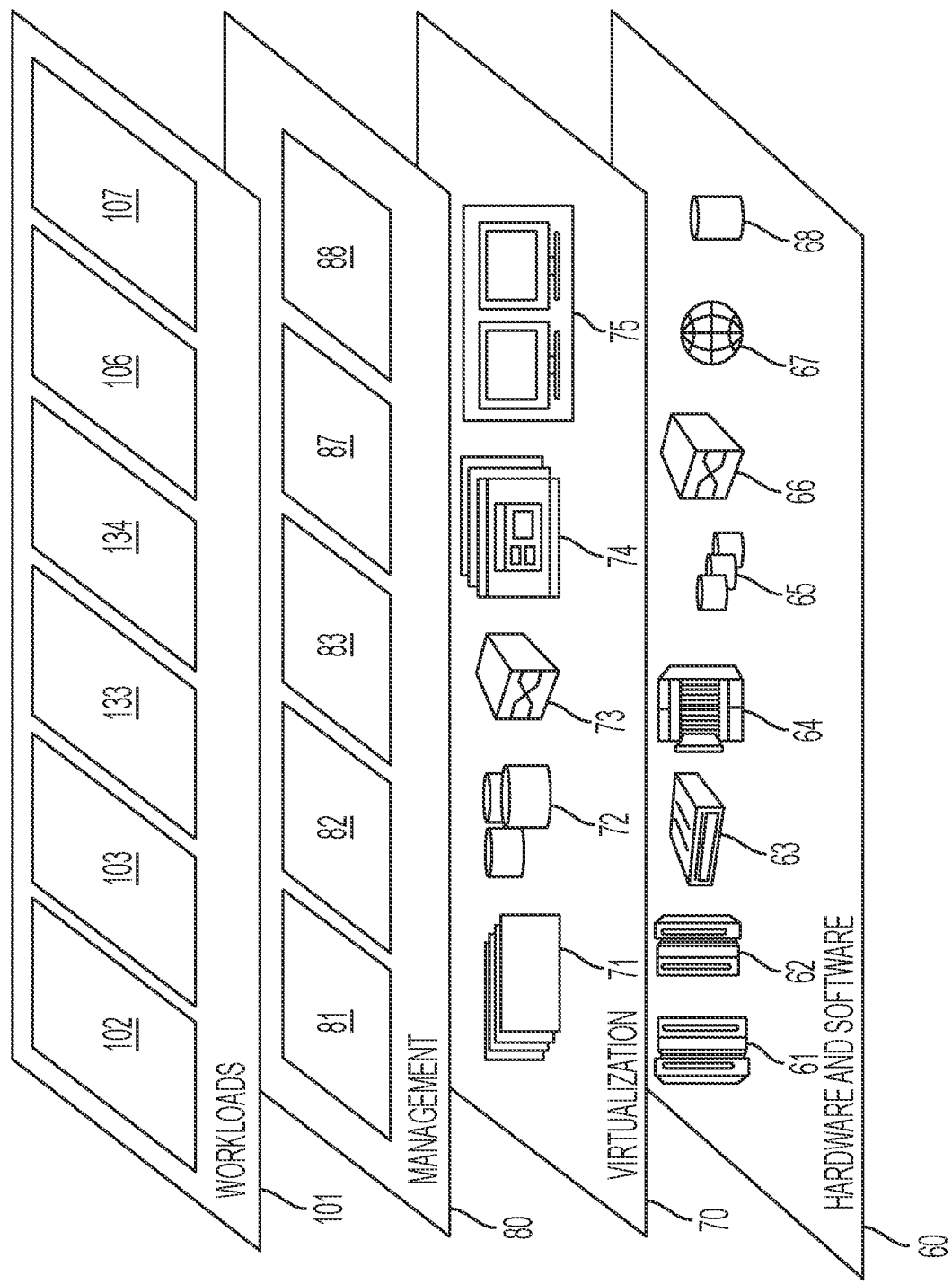
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with determining an AI input intention of a user; extracting key information from the audible user input and inputting the key information into a database table; splicing the key information with additional key information resulting in the generation of a spliced data structure for merging into a final database table being converted for enabling an interactive AI interface for enabling operational functionality of an AI device 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An artificial intelligence (AI) server comprising a processor coupled to a computer-readable memory unit, the memory unit comprising instructions that when executed by the processor implements a cognitive natural language processing software framework optimization method comprising:
    receiving, by said processor from a user, instructions associated with an audible user input of said user;
    determining, by said processor executing intention recognition code with respect to said instructions and said audible user input, an AI input intention of said user;
    extracting, by said processor in response to results of said determining, key information from said audible user input;
    automatically generating, by said processor, a database table with respect to an information slot associated with a conversion process;
    inputting, by said processor, said key information into the database table;
    retrieving, by said processor, additional key information from a historical dialog table;
    generating, by said processor, a supplementary database table comprising said additional key information;
    splicing, by said processor, said key information with said additional key information resulting in the generation of a spliced data structure comprising said key information and said additional key information;
    merging, by said processor executing JOIN operation code, said spliced data structure into a final database table via execution of multi-modal semantic matching code with respect to natural language processing;
    converting, by said processor with respect to said conversion process, natural language and associated digital code of said final database table into a request code structure within an SQL structure for generating final candidate set boundaries and logical constraints using with respect to execution of NL2SQL code;
    enabling, by said processor, an interactive AI interface presenting a modified portion of said key information and said additional key information with respect to results of said converting; and
    enabling, by said processor via said interactive AI interface, operational functionality of an AI device audibly presenting results of said converting.

2. The AI server of claim 1, wherein said AI device comprises a chatbot.

3. The AI server of claim 1, wherein said key information is associated with a differing context than said additional key information.

4. The AI server of claim 1, wherein said database table and said supplementary database table each comprise an unstructured one dimensional sentence-slot structure, and wherein said final database table comprises a structured two dimensional database table.

5. The AI server of claim 1, wherein said extracting said key information comprises executing bidirectional encoder representations from transformers (BERT) and conditional random field (CRF) code for enabling said extracting.

6. The AI server of claim 1, wherein said merging is executed within a relational database.

7. The AI server of claim 1, wherein said SQL structure is configured to modify said final database table.

8. A cognitive natural language processing software framework optimization method comprising:
    receiving, by a processor of an artificial intelligence (AI) server from a user, instructions associated with an audible user input of said user;
    determining, by said processor executing intention recognition code with respect to said instructions and said audible user input, an AI input intention of said user;
    extracting, by said processor in response to results of said determining, key information from said audible user input;
    automatically generating, by said processor, a database table with respect to an information slot associated with a conversion process;
    inputting, by said processor, said key information into the database table;
    retrieving, by said processor, additional key information from a historical dialog table;
    generating, by said processor, a supplementary database table comprising said additional key information;
    splicing, by said processor, said key information with said additional key information resulting in the generation of a spliced data structure comprising said key information and said additional key information;
    merging, by said processor executing JOIN operation code, said spliced data structure into a final database table via execution of multi-modal semantic matching code with respect to natural language processing;
    converting, by said processor with respect to said conversion process, natural language and associated digital code of said final database table into a request code structure within an SQL structure for generating final candidate set boundaries and logical constraints using with respect to execution of NL2SQL code;
    enabling, by said processor, an interactive AI interface presenting a modified portion of said key information and said additional key information with respect to results of said converting; and
    enabling, by said processor via said interactive AI interface, operational functionality of an AI device audibly presenting results of said converting.

9. The method of claim 8, wherein said AI device comprises a chatbot.

10. The method of claim 8, wherein said key information is associated with a differing context than said additional key information.

11. The method of claim 8, wherein said database table and said supplementary database table each comprise an unstructured one dimensional sentence-slot structure, and wherein said final database table comprises a structured two dimensional database table.

12. The method of claim 8, wherein said extracting said key information comprises executing bidirectional encoder representations from transformers (BERT) and conditional random field (CRF) code for enabling said extracting.

13. The method of claim 8, wherein said merging is executed within a relational database.

14. The method of claim 8, wherein said SQL structure is configured to modify said final database table.

15. The method of claim 8, further comprising:
providing at least one support service for at least one of creating, integrating, hosting, maintaining, and deploying computer-readable code in the AI server, said code being executed by the processor to implement: said receiving, said determining, said extracting, said inputting, said retrieving, said generating, said splicing, said merging, said converting, said enabling said interactive AI interface, and said enabling said operational functionality.

16. A computer program product, comprising a computer readable hardware storage device storing a computer readable program code, said computer readable program code comprising an algorithm that when executed by a processor of an AI server implements a cognitive natural language processing software framework optimization method, said method comprising:
monitoring, by said processor, executing an opensource monitor component, operational performance of a software model;
receiving, by a processor of an artificial intelligence (AI) server from a user, instructions associated with an audible user input of said user;
determining, by said processor executing intention recognition code with respect to said instructions and said audible user input, an AI input intention of said user;
extracting, by said processor in response to results of said determining, key information from said audible user input;
automatically generating, by said processor, a database table with respect to an information slot associated with a conversion process;
inputting, by said processor, said key information into the database table;
retrieving, by said processor, additional key information from a historical dialog table;
generating, by said processor, a supplementary database table comprising said additional key information;
splicing, by said processor, said key information with said additional key information resulting in the generation of a spliced data structure comprising said key information and said additional key information;
merging, by said processor executing JOIN operation code, said spliced data structure into a final database table via execution of multi-modal semantic matching code with respect to natural language processing;
converting, by said processor with respect to said conversion process, natural language and associated digital code of said final database table into a request code structure within an SQL structure for generating final candidate set boundaries and logical constraints using with respect to execution of NL2SQL code;
enabling, by said processor, an interactive AI interface presenting a modified portion of said key information and said additional key information with respect to results of said converting; and
enabling, by said processor via said interactive AI interface, operational functionality of an AI device audibly presenting results of said converting.

17. The computer program product of claim 16, wherein said AI device comprises a chatbot.

18. The computer program product of claim 16, wherein said key information is associated with a differing context than said additional key information.

19. The computer program product of claim 16, wherein said database table and said supplementary database table each comprise an unstructured one dimensional sentence-slot structure, and wherein said final database table comprises a structured two dimensional database table.

20. The computer program product of claim 16, wherein said extracting said key information comprises executing bidirectional encoder representations from transformers (BERT) and conditional random field (CRF) code for enabling said extracting.

* * * * *